United States Patent
Su et al.

(10) Patent No.: US 9,478,862 B2
(45) Date of Patent: Oct. 25, 2016

(54) TUNABLE ANTENNA AND WIRELESS COMMUNICATION DEVICE EMPLOYING SAME

(71) Applicant: Chiun Mai Communication Systems, Inc., New Taipei (TW)

(72) Inventors: Wei-Cheng Su, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 148 days.

(21) Appl. No.: 14/463,880

(22) Filed: Aug. 20, 2014

(65) Prior Publication Data
US 2015/0057054 A1 Feb. 26, 2015

(30) Foreign Application Priority Data
Aug. 22, 2013 (CN) .................. 2013 2 05127565 U

(51) Int. Cl.
| | | |
|---|---|---|
| *H01Q 11/12* | (2006.01) | |
| *H04B 1/04* | (2006.01) | |
| *H01Q 5/35* | (2015.01) | |
| *H01Q 1/24* | (2006.01) | |
| *H01Q 5/314* | (2015.01) | |
| *H01Q 5/335* | (2015.01) | |
| *H04B 1/00* | (2006.01) | |

(52) U.S. Cl.
CPC .............. *H01Q 5/35* (2015.01); *H01Q 1/243* (2013.01); *H01Q 5/314* (2015.01); *H01Q 5/335* (2015.01); *H04B 1/005* (2013.01); *H04B 1/0458* (2013.01)

(58) Field of Classification Search
CPC ........ H01Q 1/242; H01Q 1/243; H01Q 5/30; H01Q 5/335; H01Q 5/392; H01Q 9/0442; H04B 1/005; H04B 1/0458
USPC .......... 455/120, 121, 123, 553.1, 575.7, 132
See application file for complete search history.

(56) References Cited

U.S. PATENT DOCUMENTS

| | | | | |
|---|---|---|---|---|
| 6,255,994 | B1 * | 7/2001 | Saito ........................ | H01Q 1/38 343/700 MS |
| 2001/0054981 | A1 * | 12/2001 | Boyle ....................... | H01Q 5/00 343/702 |
| 2003/0174092 | A1 * | 9/2003 | Sullivan ................. | H01Q 1/243 343/702 |
| 2004/0132487 | A1 * | 7/2004 | Kearns ................... | H04B 1/005 455/552.1 |
| 2005/0128155 | A1 * | 6/2005 | Fukuda .................. | H01Q 1/242 343/745 |
| 2006/0139211 | A1 * | 6/2006 | Vance .................. | H01Q 9/0421 343/700 MS |
| 2008/0018541 | A1 * | 1/2008 | Pang ....................... | H01Q 1/243 343/702 |
| 2012/0112969 | A1 * | 5/2012 | Caballero .............. | H01Q 1/243 343/702 |
| 2012/0295554 | A1 * | 11/2012 | Greene ................ | H04B 1/0458 455/77 |
| 2012/0319918 | A1 * | 12/2012 | Ramachandran .... | H01Q 9/0442 343/852 |
| 2013/0127674 | A1 * | 5/2013 | Korva .................... | H01Q 1/243 343/702 |
| 2013/0201067 | A1 * | 8/2013 | Hu ........................ | H01Q 1/243 343/745 |
| 2014/0333495 | A1 * | 11/2014 | Vazquez ................. | H01Q 9/06 343/745 |

* cited by examiner

Primary Examiner — Duc M Nguyen
(74) Attorney, Agent, or Firm — Zhigang Ma

(57) ABSTRACT

A wireless communication device includes a substrate and a tunable antenna. The substrate has a signal source. The tunable antenna includes a metal cover and at least one matching circuit. The metal cover serves as a cover of the wireless communication device, and includes a radiation body, a main body, and a dielectric member coupled between the radiation body and the main body. The radiation body is coupled to the signal source and dielectric relative to the main body. The at least one matching circuit is configured to switch between multiple working mode to enable the radiation body to receive and send wireless signals at different frequency bands.

20 Claims, 6 Drawing Sheets

TUNABLE ANTENNA AND WIRELESS COMMUNICATION DEVICE EMPLOYING SAME

FIELD

The subject matter herein generally relates to antenna structures, and particular to a tunable antenna and wireless communication device employing same.

BACKGROUND

With improvements in the integration of wireless communication systems, broadband antennas have become increasingly important. For a wireless communication device to utilize various frequency bandwidths, antennas having wider bandwidths have become a significant technology.

BRIEF DESCRIPTION OF THE DRAWINGS

Implementations of the present technology will now be described, by way of example only, with reference to the attached figures.

DETAILED DESCRIPTION

Figure 1:
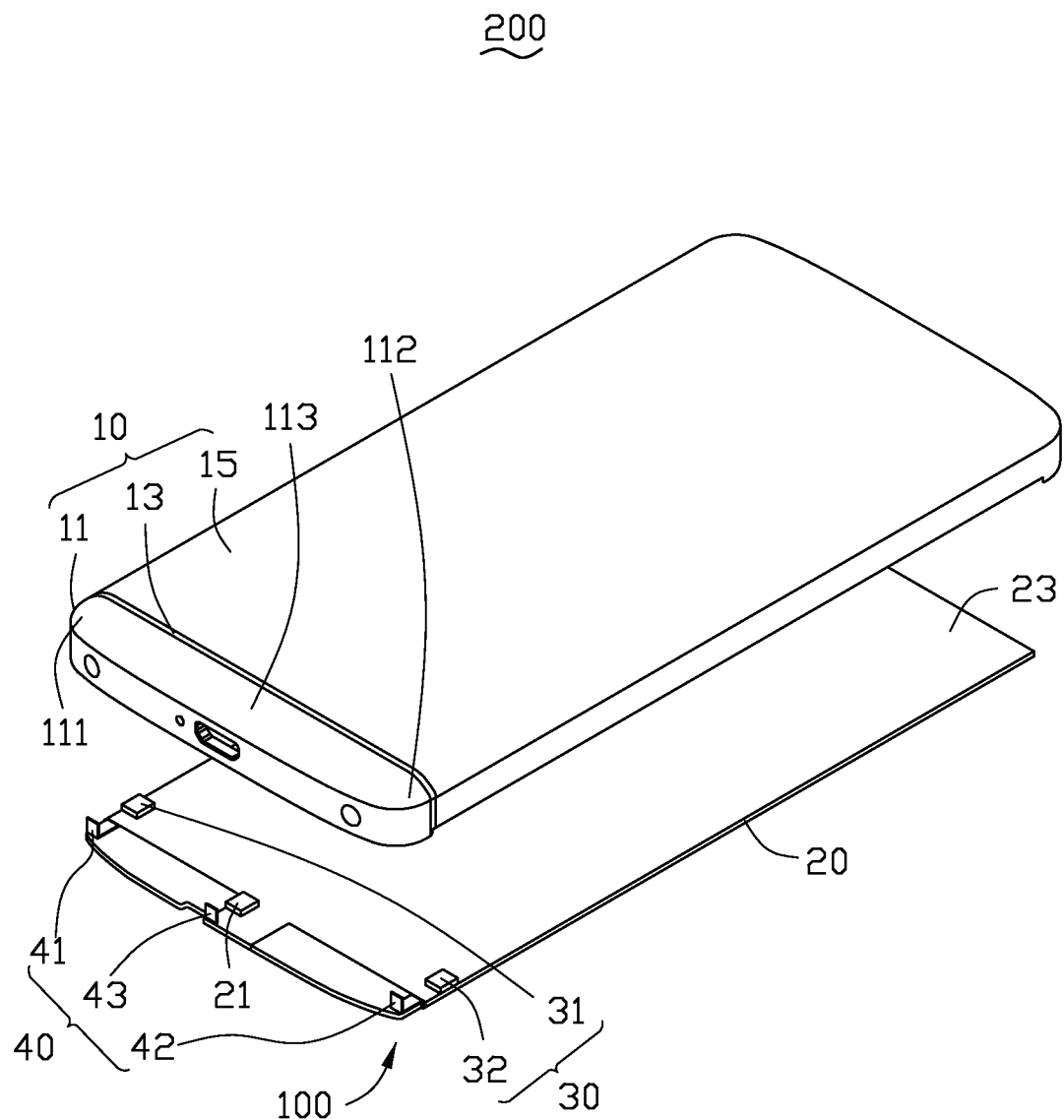
FIG. 1 is an isometric view of one embodiment of a wireless communication device employing a tunable antenna.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

FIG. 1 illustrates an isometric view of one embodiment of a wireless communication device 200 employing a tunable antenna 100 and a substrate 20. The substrate 20 has a signal source 21. The tunable antenna 100 includes a metal cover 10 and at least one matching circuit 30. The metal cover 10 serves as a cover of the wireless communication device 100, and includes a radiation body 11, a main body 15, and a dielectric member 13 coupled between the radiation body 11 and the main body 15. The radiation body 11 is electronically coupled to the signal source 21 and dielectric relative to the main body 15. The at least one matching circuit 30 is electronically coupled to the radiation body 11 and arranged on the substrate 20. The at least one matching circuit 30 is configured to switch between multiple working mode to enable the radiation body 11 to receive and send wireless signals at different frequency bands.

In one embodiment, the at least one matching circuit includes a first matching circuit 31 and a second matching circuit 32 (shown in FIG. 1). The radiation body 11 includes a first signal point 111, a second signal point 112, and a feeding point located between the first signal point 111 and the second signal point 112, the first signal point 111 and the second signal point 112 are arranged at two opposite ends of the radiation body 11 respectively. The first signal point 111, the second signal point 112 and the feeding point are electronically coupled to the first matching circuit 31, the second matching circuit 32 and the signal source 21, respectively.

The tunable antenna 100 further includes a connecting assembly 40. The connecting assembly 40 includes a first connecting member, a second connecting member 42, and a third connecting member 43, all of which are located on the substrate 20 corresponding to the first signal point 111, the second signal point 112 and the feeding point, respectively. The first connecting member is configured to electronically couple the first signal point 111 with the first matching circuit 31; the second connecting member 42 is configured to electronically couple the second signal point 112 with the second matching circuit 32; and the third connecting member 43 is configured to electronically couple the feeding point with the signal source 21. In one embodiment, the first connecting member, the second connecting member 42, and the third connecting member 43 are metal sheets.

The substrate 20 includes a ground layer 23 formed thereon. The main body 15 is electronically coupled to the ground layer 23, such that noise signals generated by the main body 15 can be eliminated, and the radiation body 11 can be prevented from being interfered by the noise signals.

Figure 2:
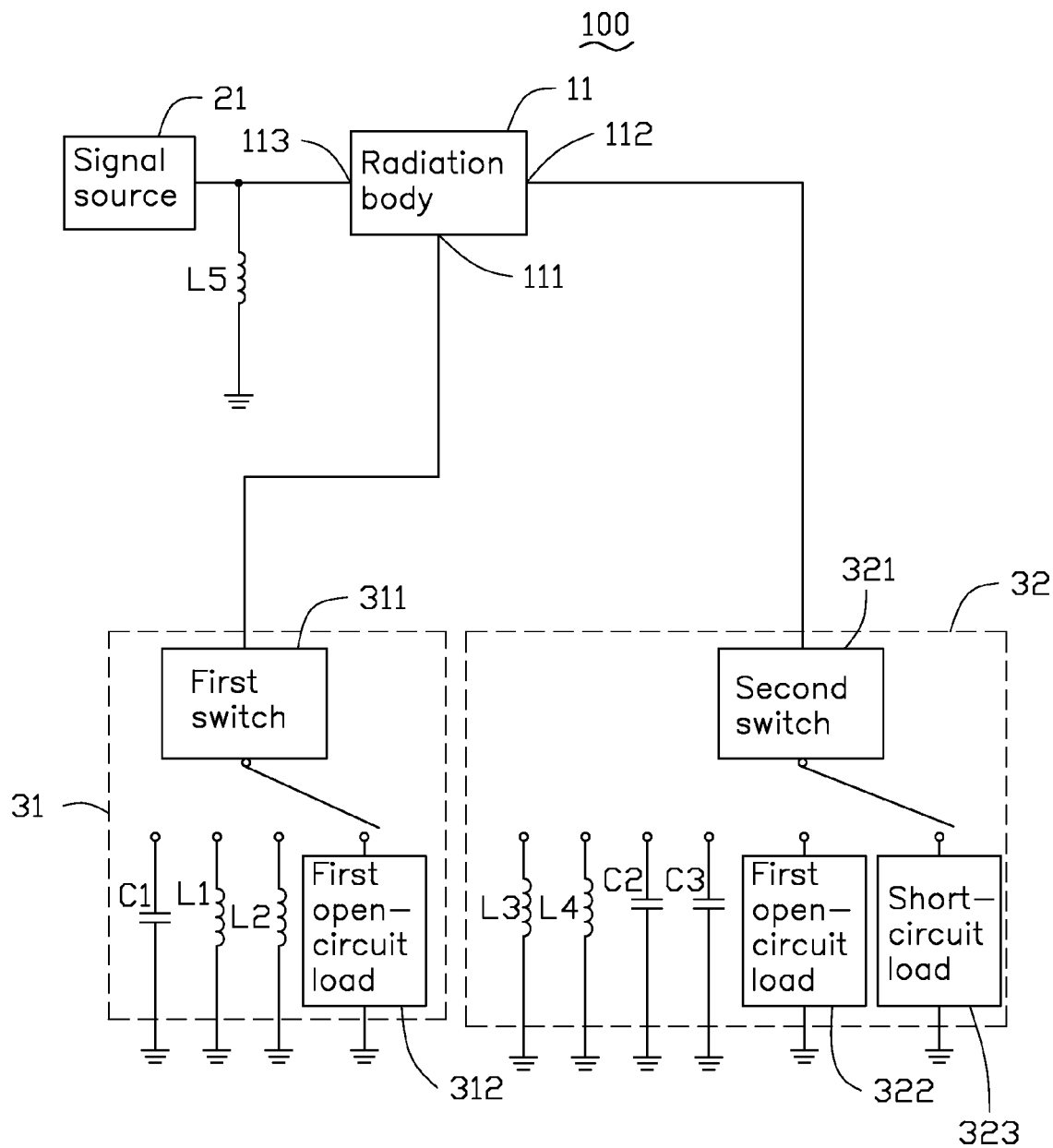
FIG. 2 is a circuit diagram of the tunable antenna shown in FIG. 1.

FIG. 2 illustrates a circuit diagram of the tunable antenna 100 as shown in FIG. 1. The first matching circuit 31 includes a first switch 311, a plurality of first loads and a first open-circuit load 312. Each of the plurality of first loads is grounded. The first switch 311 is configured to selectively couple the first signal point 111 with either the first open-circuit load 312 or one of the plurality of first loads. In one embodiment, the plurality of first loads includes a capacitor L1, an inductor L1, and an inductor L2, each of which has a first end can be coupled to the first switch 311, and a second end that is grounded. When the first switch 311 couples the first signal point 111 with the first open-circuit load 312, the first signal point 111 is brought into an open-circuit state.

The second matching circuit 32 includes a second switch 321, a plurality of second loads, a second open-circuit load 322, and a short-circuit load 323. Each of the plurality of second loads is ground. The second switch 321 is configured to selectively coupled the second signal point 112 with the third end of one of the second loads, the second open-circuit load 322 or the short-circuit load 323. In one embodiment, the plurality of second loads includes two capacitors C2-C3, and two inductors L3-L4, each of which has a third end can be coupled to the second switch 321, and a fourth end that is grounded. When the second switch 321 couples the second signal point 112 with the second open-circuit load 322, the second signal point 112 is brought into an open-circuit state. When the second switch 321 couples the second signal point 112 with the short-circuit load 323, the second signal point 112 is brought into a short-circuit state.

In one embodiment, a capacitance of the capacitor C1 is 9.1 pF; a capacitance of the capacitor C2 is 0.8 pF; a capacitance of the capacitor C3 is 0.5 pF; an inductance of the inductor L1 is 1.8 nH; an inductance of the inductor L2 is 1 nH; an inductance of the inductor L3 is 91 nH; and an inductance of the inductor L4 is 22 nH.

When the second switch 321 couples the second signal point 112 to the short-circuit load 323 to bring the second signal point 112 into a short-circuit state, the first switch 311 can selectively couple the first signal point 111 with one of the inductor L1, the inductor L2, or the capacitor C1, to enable the radiation body 11 to receive and send a first high-frequency band signal, a second high-frequency band signal or a third high-frequency band signal, respectively. When the second switch 321 couples the second signal point 112 to the second open-circuit load 322 to bring the second signal point 112 into an open-circuit state, and the first switch 311 couples the first signal point 111 with the capacitor C1, the radiation body 11 can receive and send a fourth high-frequency band wireless signal.

When the first switch 311 couples the first signal point 111 to the first open-circuit load 312 to bring the first signal point 111 into an open-circuit state, the second switch 321 is configured to selectively couple the second signal point 112 with one of the capacitor C2, the capacitor C3, the inductor L3, and the inductor L4, thereby enabling the radiation body 11 to receive and send a first low-frequency band signal, a second low-frequency band signal, a third low-frequency band signal, and a fourth low-frequency band signal.

Figure 3:
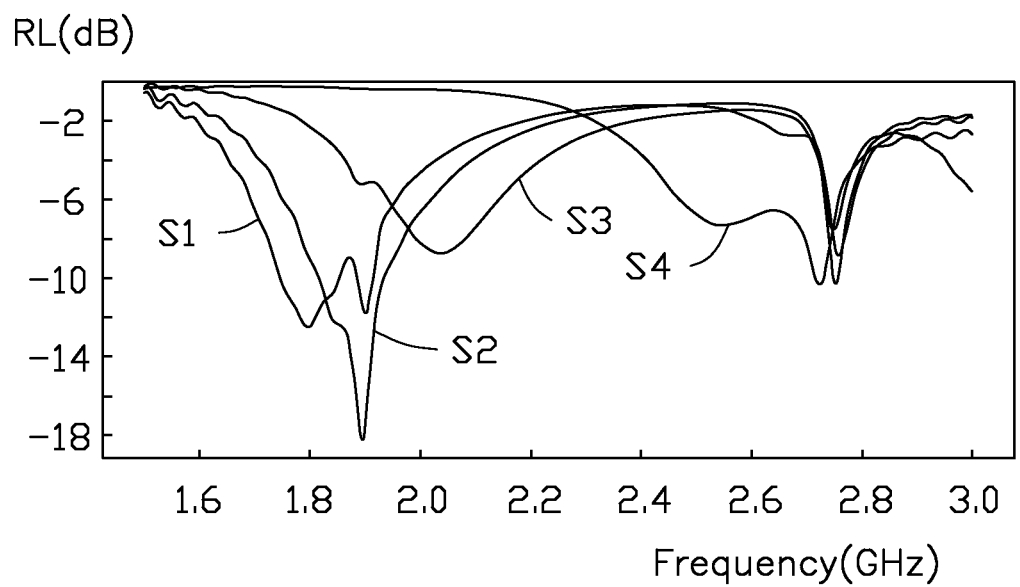
FIG. 3 is a diagram showing high-frequency band return loss (RL) measurements of the tunable antenna of FIG. 1.

FIG. 3 illustrates a diagram showing high-frequency band return loss (RL) measurements of the tunable antenna 100 of FIG. 1. Curve S1 represents a RL of the tunable antenna 100 when the second switch 321 couples the second signal point 112 to the short-circuit load 323, and the first switch 311 couples the first signal point 111 with the inductor L1, it can be derived from the curve S1 that the tunable antenna 100 can receive/send signal at the first high-frequency band of GSM1800/LET Band 3. Curve S2 represents a RL of the tunable antenna 100 when the second switch 321 couples the second signal point 112 to the short-circuit load 323, and the first switch 311 couples the first signal point 111 with the inductor L2, it can be derived from the curve S2 that the tunable antenna 100 can receive/send signal at the second high-frequency band of GSM1900/LET Band 2. Curve S3 represents a RL of the tunable antenna 100 when the second switch 321 couples the second signal point 112 to the short-circuit load 323, and the first switch 311 couples the first signal point 111 with the capacitor C1, it can be derived from the curve S3 that the tunable antenna 100 can receive/send signal at the third high-frequency band of WCDMA/LET Band 1. Curve S4 represents a RL of the tunable antenna 100 when the second switch 321 couples the second signal point 112 to the second open-circuit load 322, and the first switch 311 couples the first signal point 111 with the capacitor C1, it can be derived from the curve S4 that the tunable antenna 100 can receive/send signal at the fourth high-frequency band of LET Band 7.

Figure 4:
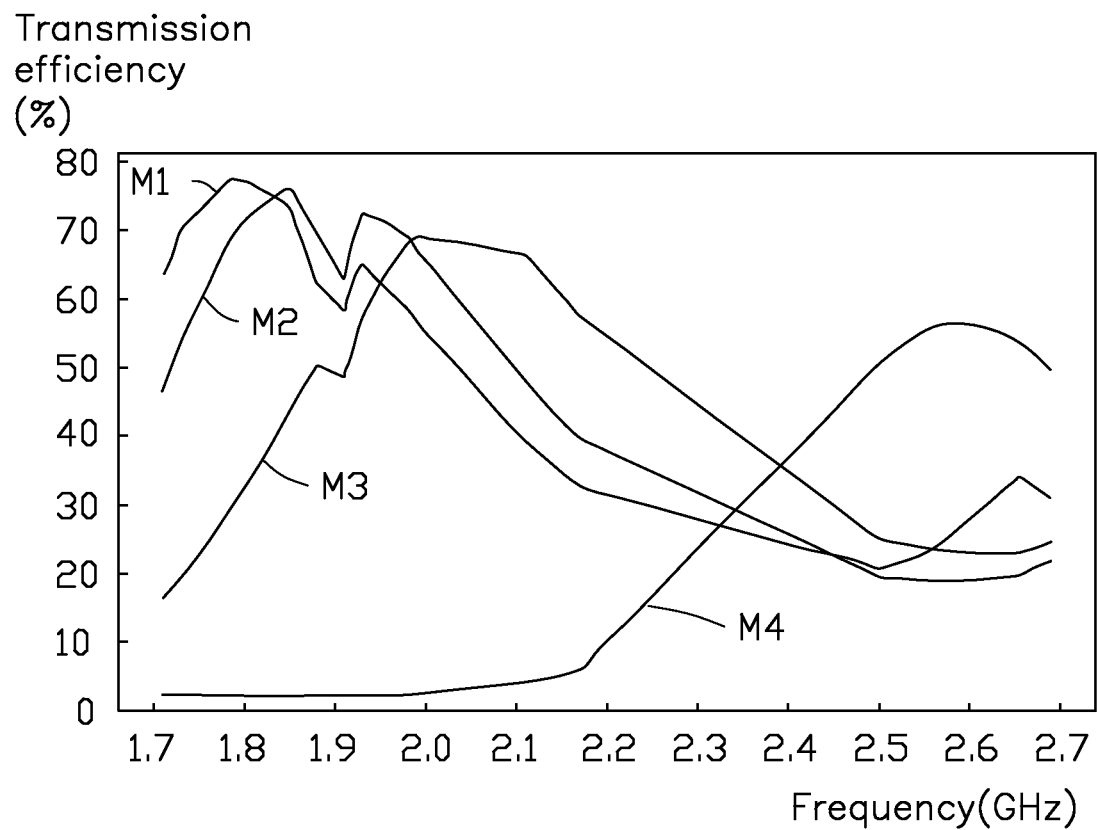
FIG. 4 is a diagram showing high-frequency band transmission efficiency measurements of the tunable antenna of FIG. 1.

FIG. 4 illustrates a diagram showing high-frequency band transmission efficiency measurements of the tunable antenna 100 of FIG. 1. Curve M1 represents a transmission efficiency of the tunable antenna 100 when the second switch 321 couples the second signal point 112 to the short-circuit load 323, and the first switch 311 couples the first signal point 111 with the inductor L1. Curve M2 represents a transmission efficiency of the tunable antenna 100 when the second switch 321 couples the second signal point 112 to the short-circuit load 323, and the first switch 311 couples the first signal point 111 with the inductor L2. Curve M3 represents a transmission efficiency of the tunable antenna 100 when the second switch 321 couples the second signal point 112 to the short-circuit load 323, and the first switch 311 couples the first signal point 111 with the capacitor C1. Curve M4 represents a transmission efficiency of the tunable antenna 100 when the second switch 321 couples the second signal point 112 to the second open-circuit load 322, and the first switch 311 couples the first signal point 111 with the capacitor C1. It can be derived from FIG. 4 that the antenna structure 100 can achieve exceptional transmission efficiency when the first matching circuit 31 switches to different working modes.

Figure 5:
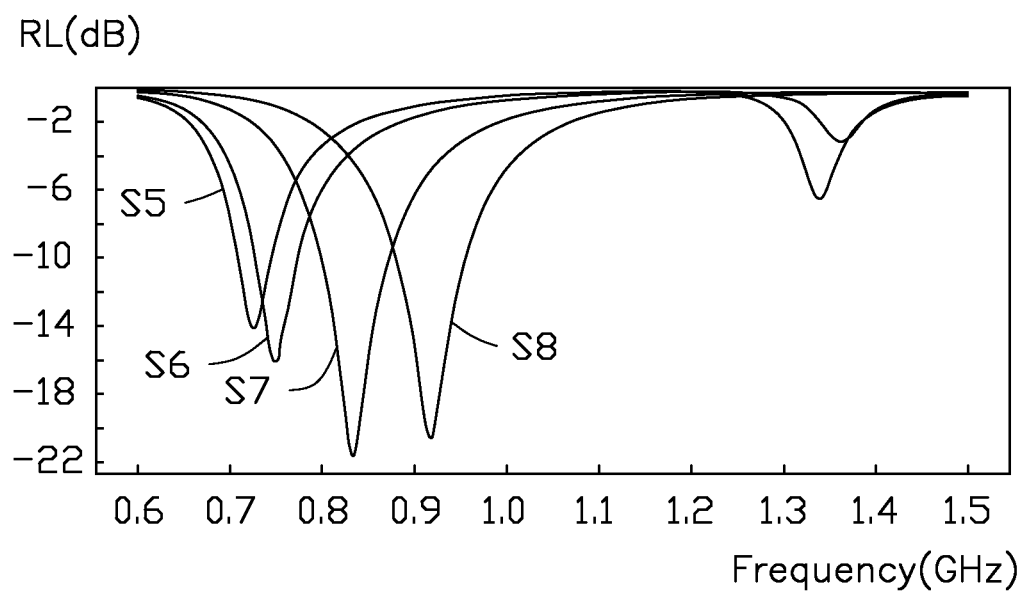
FIG. 5 is a diagram showing low-frequency band RL measurements of the tunable antenna of FIG. 1.

FIG. 5 illustrates a diagram showing low-frequency band return loss (RL) measurements of the tunable antenna 100 of FIG. 1. Curve S5 represents a RL of the tunable antenna 100 when the first switch 311 couples the first signal point 111 to the open-circuit load 312, and the second switch 321 couples the second signal point 112 with the capacitor C2, it can be derived from the curve S5 that the tunable antenna 100 can receive/send signal at the first high-frequency band of LET Band 17. Curve S6 represents a RL of the tunable antenna 100 when the first switch 311 couples the first signal point 111 to the open-circuit load 312, and the second switch 321 couples the second signal point 112 with the capacitor C3, it can be derived from the curve S6 that the tunable antenna 100 can receive/send signal at the first high-frequency band of LET Band 13. Curve S7 represents a RL of the tunable antenna 100 when the first switch 311 couples the first signal point 111 to the open-circuit load 312, and the second switch 321 couples the second signal point 112 with the inductor L3, it can be derived from the curve S7 that the tunable antenna 100 can receive/send signal at the first high-frequency band of GSM850/LTE Band 5. Curve S8 represents a RL of the tunable antenna 100 when the first switch 311 couples the first signal point 111 to the open-circuit load 312, and the second switch 321 couples the second signal point 112 with the inductor L4, it can be derived from the curve S8 that the tunable antenna 100 can receive/send signal at the first high-frequency band of GSM900/LTE Band 8.

Figure 6:
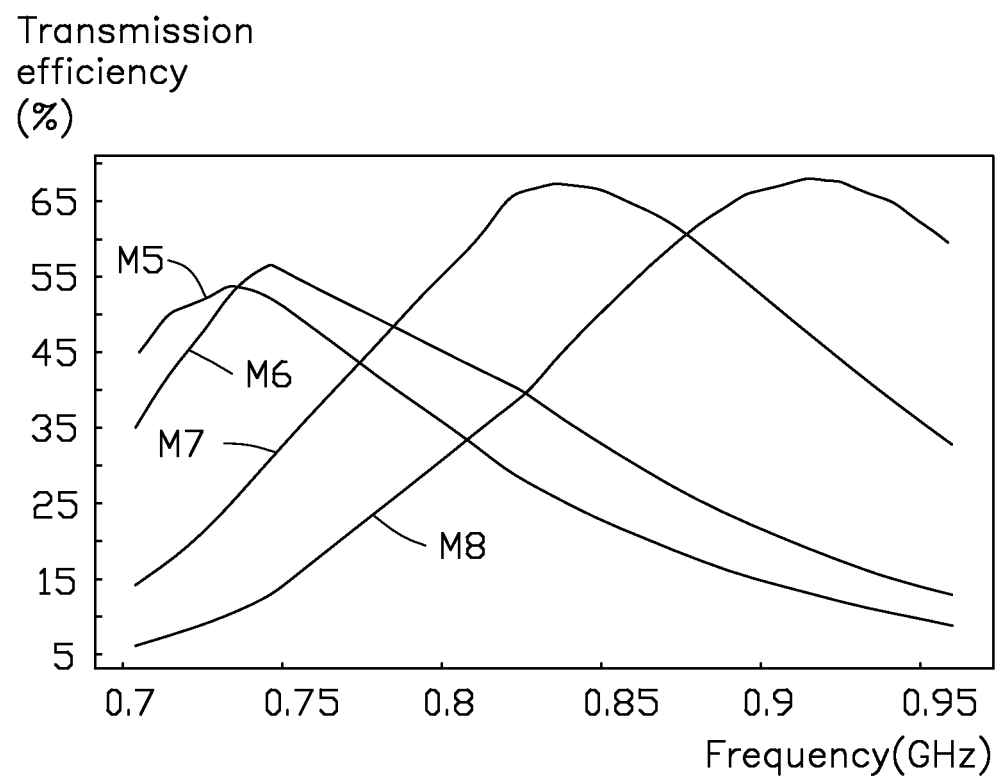
FIG. 6 is a diagram showing low-frequency band transmission efficiency measurements of the tunable antenna of FIG. 1.

FIG. 6 illustrates a diagram showing low-frequency band transmission efficiency measurements of the tunable antenna 100 of FIG. 1. Curve M5 represents a transmission efficiency of the tunable antenna 100 when the first switch 311 couples the first signal point 111 to the open-circuit load 312, and the second switch 321 couples the second signal point 112 with the capacitor C2. Curve M6 represents a transmission efficiency of the tunable antenna 100 when the first switch 311 couples the first signal point 111 to the open-circuit load 312, and the second switch 321 couples the second signal point 112 with the capacitor C3. Curve M7 represents a transmission efficiency of the tunable antenna 100 when the first switch 311 couples the first signal point 111 to the open-circuit load 312, and the second switch 321 couples the second signal point 112 with the inductor L3. Curve M8 represents a transmission efficiency of the tunable antenna 100 when the first switch 311 couples the first signal point 111 to the open-circuit load 312, and the second switch 321 couples the second signal point 112 with the inductor L4. It can be derived from FIG. 6 that the antenna structure 100 can achieve exceptional transmission efficiency when the second matching circuit 32 switches to different working modes.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A wireless communication device comprising:
a substrate having a signal source; and
a tunable antenna comprising:
 a metal cover serving as a cover of the wireless communication device, the metal cover comprising a radiation body, a main body, and a dielectric member coupled between the radiation body and the main body; the radiation body dielectric relative to the main body and comprising a first signal point, a second signal point, and a feeding point the feeding point electronically coupled to the signal source; and
 a tunable antenna arranged on the substrate and comprising a first matching circuit and a second matching circuit, the first matching circuit coupled to the first signal point of the radiation body, the second matching circuit coupled to the second signal point of the radiation body;
wherein when the first matching circuit is coupled to the first signal point of the radiation body to enable the first signal point in an open-circuit state, the second matching circuit enable the radiation body to receive and send wireless signals at different frequency bands;
when the second matching circuit is coupled to the second signal point of the radiation body to enable the second signal point in an short-circuit state, the first matching circuit enable the radiation body to receive and send wireless signals at different frequency bands.

2. The wireless communication device of claim 1, wherein the feeding point located between the first signal point and the second signal point, the first signal point and the second signal point are arranged at two opposite ends of the radiation body respectively.

3. The wireless communication device of claim 2, further comprising a connecting assembly, wherein the connecting assembly comprises a first connecting member, a second connecting member, and a third connecting member all of which are located on the substrate corresponding to the first signal point, the second signal point and the feeding point, respectively;
the first connecting member is configured to electronically couple the first signal point with the first matching circuit; the second connecting member is configured to electronically couple the second signal point with the second matching circuit; the third connecting member is configured to electronically couple the feeding point with the signal source.

4. The wireless communication device of claim 3, wherein the first connecting member, the second connecting member, and the third connecting member are metal sheets.

5. The wireless communication device of claim 1, wherein the substrate comprises a ground layer formed thereon, the main body is coupled to the ground layer.

6. The wireless communication device of claim 1, wherein the first matching circuit comprises a first switch, a first open-circuit load and a plurality of first loads that are grounded; the first switch is configured to selectively couple the first signal point with either the first open-circuit load or one of the plurality of first loads.

7. The wireless communication device of claim 6, wherein the second matching circuit comprises a second switch, a second open-circuit load and a short-circuit load, and a plurality of second loads that are grounded; the second switch is configured to selectively couple the second signal point with one of the second loads, the second open-circuit load or the short-circuit load.

8. The wireless communication device of claim 7, wherein the plurality of first loads comprises a capacitor, a first inductor, and a second inductor; when the second switch couples the second signal point to the short-circuit load to bring the second signal point into a short-circuit state, the first switch is configured to selectively couple the first signal point with one of the first inductor, the second inductor, or the capacitor, thereby enabling the radiation body to receive and send a first high-frequency band signal, a second high-frequency band signal or a third high-frequency band signal, respectively.

9. The wireless communication device of claim 8, wherein when the second switch couples the second signal point to the second open-circuit load to bring the second signal point into an open-circuit state, the first switch is configured to couple the first signal point with the capacitor, to enable the radiation body to receive and send a fourth high-frequency band wireless signal.

10. The wireless communication device of claim 7, wherein the plurality of second loads comprises a first capacitor, a second capacitor, a first inductor, and a second inductor; when the first switch couples the first signal point to the first open-circuit load to bring the first signal point into an open-circuit state, the second switch is configured to selectively couple the second signal point with one of the first capacitor, the second capacitor, the first inductor, and the second inductor, thereby enabling the radiation body to receive and send a first low-frequency band signal, a second low-frequency band signal, a third low-frequency band signal, and a fourth low-frequency band signal.

11. A tunable antenna comprising:
a metal cover comprising a radiation body, a main body, and a dielectric member coupled between the radiation body and the main body; the radiation body dielectric relative to the main body and comprising a first signal point, a second signal point, and a feeding point the feeding point electronically coupled to a signal; and
a first matching circuit coupled to the first signal point of the radiation body; and
a second matching circuit coupled to the second signal point of the radiation body;

wherein when the first matching circuit is coupled to the first signal point of the radiation body to enable the first signal point in an open-circuit state, the second matching circuit enable the radiation body to receive and send wireless signals at different frequency bands;

when the second matching circuit is coupled to the second signal point of the radiation body to enable the second signal point in an short-circuit state, the first matching circuit enable the radiation body to receive and send wireless signals at different frequency bands.

12. The tunable antenna of claim 11, wherein the feeding point located between the first signal point and the second signal point, the first signal point and the second signal point are arranged at two opposite ends of the radiation body respectively.

13. The tunable antenna of claim 12, further comprising a connecting assembly, wherein the connecting assembly comprises a first connecting member, a second connecting member, and a third connecting member all of which are arranged corresponding to the first signal point, the second signal point and the feeding point, respectively; the first connecting member is configured to electronically couple the first signal point with the first matching circuit; the second connecting member is configured to electronically couple the second signal point with the second matching circuit; the third connecting member is configured to electronically couple the feeding point with the signal source.

14. The tunable antenna of claim 13, wherein the first connecting member, the second connecting member, and the third connecting member are metal sheets.

15. The tunable antenna of claim 11, wherein the first matching circuit comprises a first switch, a first open-circuit load, and a plurality of first loads that are grounded; the first switch is configured to selectively couple the first signal point with the first open-circuit load or one of the plurality of first loads.

16. The tunable antenna of claim 15, wherein the second matching circuit comprises a second switch, a second open-circuit load, a short-circuit load, and a plurality of second loads that are grounded; the second switch is configured to selectively couple the second signal point with one of the second loads, the second open-circuit load or the short-circuit load.

17. The tunable antenna of claim 16, wherein the plurality of first loads comprises a capacitor, a first inductor, and a second inductor; when the second switch couples the second signal point to the short-circuit load to bring the second signal point into a short-circuit state, the first switch is configured to selectively couple the first signal point with one of the first inductor, the second inductor, or the capacitor, thereby enabling the radiation body to receive and send a first high-frequency band signal, a second high-frequency band signal or a third high-frequency band signal, respectively.

18. The tunable antenna of claim 17, wherein when the second switch couples the second signal point to the second open-circuit load to bring the second signal point into an open-circuit state, the first switch is configured to couple the first signal point with the capacitor, to enable the radiation body to receive and send a fourth high-frequency band wireless signal.

19. The tunable antenna of claim 16, wherein the plurality of second loads comprises a first capacitor, a second capacitor, a first inductor, and a second inductor; when the first switch couples the first signal point to the first open-circuit load to bring the first signal point into an open-circuit state, the second switch is configured to selectively couple the second signal point with one of the first capacitor, the second capacitor, the first inductor, and the second inductor, thereby enabling the radiation body to receive and send a first low-frequency band signal, a second low-frequency band signal, a third low-frequency band signal, and a fourth low-frequency band signal.

20. A tunable antenna for use in a wireless communication device comprising:
a substrate having a signal source, the substrate comprising:
at least one matching circuit electronically coupled to a radiation body of the wireless communication device;
the at least one matching circuit comprising a first matching circuit and a second matching circuit; and configured to switch between multiple working modes to enable the radiation body to receive and send wireless signals at different frequency bands;
wherein when the first matching circuit is coupled to the radiation body to enable a first signal point of the radiation body in an open-circuit state, the second matching circuit enable the radiation body to receive and send wireless signals at different frequency bands;
when the second matching circuit is coupled to the radiation body to enable a second signal point of the radiation body in an short-circuit state, the first matching circuit enable the radiation body to receive and send wireless signals at different frequency bands.

* * * * *